US008688127B1

(12) United States Patent
Sigg et al.

(10) Patent No.: US 8,688,127 B1
(45) Date of Patent: Apr. 1, 2014

(54) METHOD AND SYSTEM FOR INTER-FREQUENCY HANDOFF

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 277 days.

(21) Appl. No.: 13/049,560

(22) Filed: Mar. 16, 2011

(51) Int. Cl.
*H04W 36/00* (2009.01)

(52) U.S. Cl.
USPC ............ 455/438; 455/436; 455/437; 455/441

(58) Field of Classification Search
USPC .................................................. 455/437, 438
See application file for complete search history.

(56) References Cited

U.S. PATENT DOCUMENTS

| 4,201,943 | A  | * | 5/1980  | Klank .......................... 455/185.1 |
| 6,353,603 | B1 |   | 3/2002  | Kim |
| 6,628,630 | B1 | * | 9/2003  | Nagase .......................... 370/331 |
| 6,701,148 | B1 | * | 3/2004  | Wilson et al. ................. 455/436 |
| 7,313,398 | B1 |   | 12/2007 | Ramahi |
| 2003/0129982 | A1 | * | 7/2003  | Perini ........................... 455/442 |
| 2006/0083211 | A1 | * | 4/2006  | Laroia et al. .................. 370/343 |
| 2007/0191064 | A1 | * | 8/2007  | Skarby et al. .............. 455/562.1 |
| 2008/0020791 | A1 | * | 1/2008  | Ito et al. ......................... 455/516 |
| 2008/0107082 | A1 | * | 5/2008  | Igarashi et al. ............... 370/331 |
| 2009/0122775 | A1 | * | 5/2009  | Haartsen ....................... 370/338 |
| 2010/0061480 | A1 | * | 3/2010  | Kashiwase et al. ........... 375/295 |
| 2010/0124201 | A1 | * | 5/2010  | Griot et al. .................... 370/331 |
| 2012/0071190 | A1 | * | 3/2012  | Choi et al. .................... 455/517 |

* cited by examiner

*Primary Examiner* — Charles Appiah
*Assistant Examiner* — Mazda Sabouri

(57) ABSTRACT

An inter-frequency handoff of a mobile station engaged in a call via wireless network is effected by gradually changing a carrier frequency of a forward link signal from a first-channel frequency, corresponding to a first frequency channel, to a second-channel frequency, corresponding to a second frequency channel. Initially, a first transmitter in the wireless network transmits the forward link signal in the first frequency channel. A second transmitter then transmits the forward link signal while changing the carrier frequency from the first-channel frequency to the second-channel frequency at a specified tuning rate. The tuning rate may be dynamically adjustable in response to requests from the mobile station. Once the second-channel frequency is reached, a third transmitter continues transmitting the forward link signal in the second frequency channel. The mobile station may also gradually change the carrier frequency of the reverse link signal that it transmits for the call.

14 Claims, 4 Drawing Sheets

METHOD AND SYSTEM FOR INTER-FREQUENCY HANDOFF

BACKGROUND

When a mobile station served by a wireless network moves from a first wireless coverage area (such as a cell or sector) to a second wireless coverage area while engaged in a call, a handoff may be effected so that the call can be continued via the second wireless coverage area. In many cases, the handoff is performed by making a new wireless connection with the second wireless coverage area before breaking the connection with first wireless network. This "make before break" or soft handoff is generally preferable because the call is less likely to be dropped than when a "break before make" or hard handoff is used.

However, the second wireless coverage area may use different frequencies for forward link signals and/or reverse link signals than are used in the first wireless coverage area. In that case, a soft handoff may not be available. Conventionally, inter-frequency handoffs are hard handoffs or "break before make" handoffs. As a result, conventional inter-frequency handoffs may cause calls to be dropped at an undesirably high rate.

OVERVIEW

In a first principal aspect, an exemplary embodiment provides a method for effecting an inter-frequency handoff of a mobile station engaged in a call via a wireless network. A first forward-link frequency channel is used for the call, wherein the wireless network transmits a forward link signal in the first forward-link frequency channel to the mobile station. During the call, the wireless network transmits the forward link signal to the mobile station while gradually changing a carrier frequency of the forward link signal from a first-channel frequency (corresponding to the first forward-link frequency channel) to a second-channel frequency (corresponding to the second forward-link frequency channel), so as to transition from the first forward-link frequency channel to a second forward-link frequency channel. The second forward-link frequency channel is then used for the call, wherein the wireless network transmits the forward link signal in the second forward-link frequency channel to the mobile station.

In a second principal aspect, an exemplary embodiment provides a method for a mobile station engaged in a call via a wireless network. A first forward-link frequency channel is used for the call, wherein the mobile station receives a forward link signal in the first forward-link channel from the wireless network. During the call, there is a transition from the first forward-link frequency channel to a second forward-link frequency channel, wherein the mobile station receives the forward link signal from the wireless network while a carrier frequency of the forward link signal gradually changes from a first-channel frequency (corresponding to the first forward-link frequency channel) to a second-channel frequency (corresponding to the second forward-link frequency channel). The second forward-link frequency channel is then used for the call, wherein the mobile station receives the forward link signal in the second forward-link frequency channel from the wireless network.

In a third principal aspect, an exemplary embodiment provides a system comprising a first transmitter, a second transmitter, and a third transmitter. The first transmitter is configured to transmit a forward link signal in a first forward-link channel, wherein the forward link signal in the first forward-link channel has a carrier frequency at a first-channel frequency. The second transmitter is configured to transmit the forward link signal while gradually changing the carrier frequency of the forward link signal from the first-channel frequency to a second-channel frequency. A third transmitter is configured to transmit the forward link signal in a second forward-link frequency channel, wherein the forward link signal in the second forward-link channel has a carrier frequency at the second-channel frequency.

DETAILED DESCRIPTION OF EXEMPLARY EMBODIMENTS

1. Introduction

An inter-frequency handoff of a mobile station engaged in a call via a wireless network may be effected by gradually changing a carrier frequency of a forward link signal that is used for the call from a first-channel frequency, corresponding to a first forward-link frequency channel, to a second-channel frequency, corresponding to a second forward-link frequency channel. Initially, the wireless network may use a first transmitter to transmit the forward link signal in the first forward-link frequency channel. During the call, the wireless network transitions from the first forward-link frequency channel to a second forward-link frequency channel. To make the transition, a second transmitter in the wireless network may transmit the forward link signal while changing the carrier frequency of the forward link signal from the first-channel frequency to the second-channel frequency at a specified tuning rate. The tuning rate may be dynamically adjustable in response to requests from the mobile station. Once the second-channel frequency is reached, a third transmitter in the wireless network may continue transmitting the forward link signal in the second forward-link frequency channel. The mobile station may also gradually change the carrier frequency of the reverse link signal that it transmits for the call.

2. Exemplary Network Architecture

Figure 1:
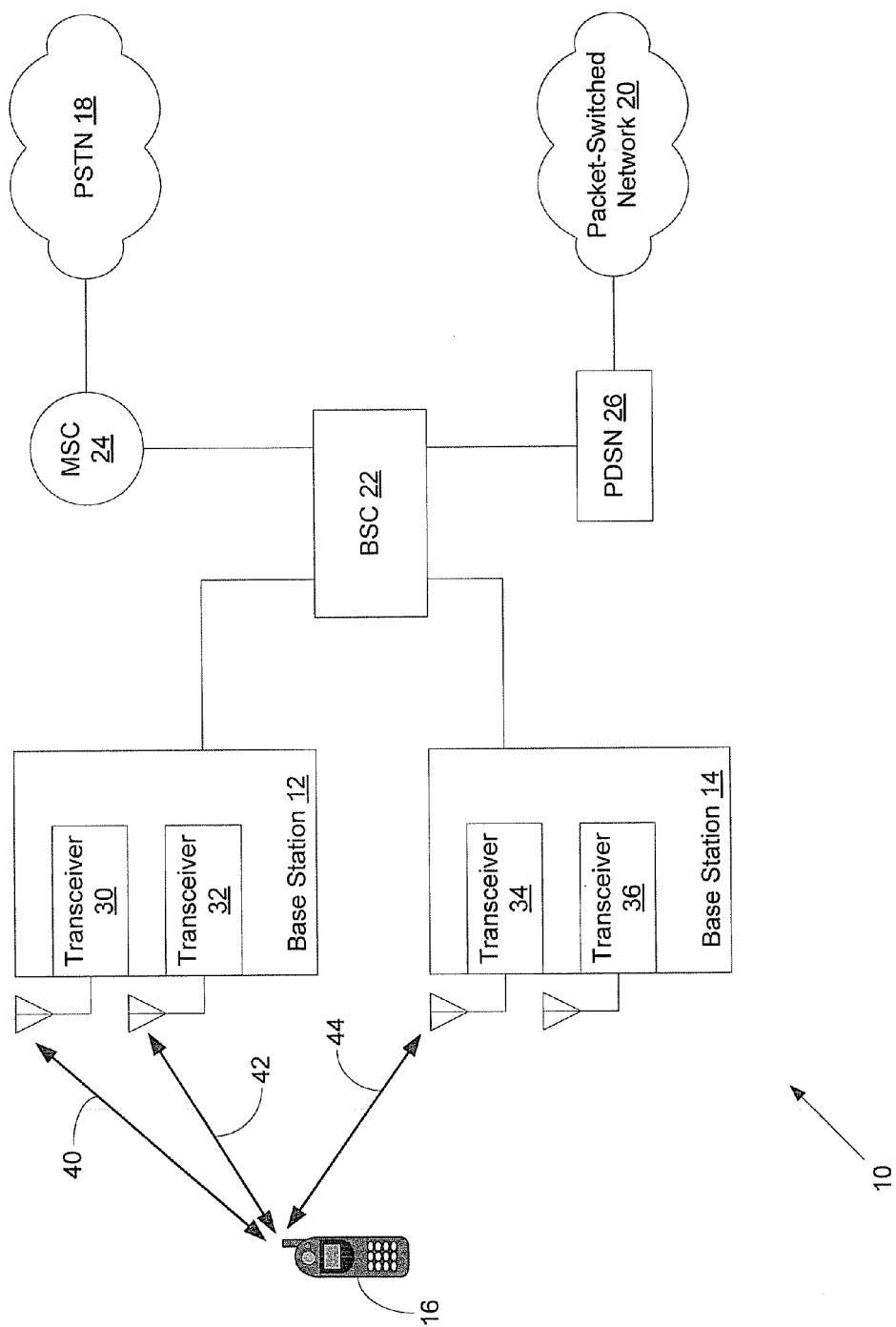
FIG. 1 is a schematic block diagram of a wireless network, in accordance with an exemplary embodiment.

FIG. 1 illustrates a wireless network 10 in which exemplary embodiments may be employed. Wireless network 10 may include one or more base stations, exemplified in FIG. 1 by base stations 12 and 14, which may wirelessly communicate with mobile stations, such as mobile station 16, within respective wireless coverage areas. Mobile station 16 could be, for example, a wireless telephone, wireless e-mail device, wirelessly-equipped portable computer, or other wireless communication device. In an exemplary embodiment, the wireless communications between mobile station 16 and wireless network 10 use spread spectrum signals, for example, in accordance with code division multiple access (CDMA) protocols. However, other types of wireless communication protocols could be used.

The wireless coverage area of a base station, such as base stations 12 and 14, could be, for example, a macrocell, microcell, picocell, or femtocell, and could be divided into a plurality of sectors. The wireless coverage areas of different base stations in wireless network 10 could be either completely overlapping, partially overlapping, or non-overlapping. In some cases, the wireless coverage area of one base station may be encompassed within the wireless coverage area of another base station. In an exemplary embodiment, the wireless coverage areas of base stations 12 and 14 are partially overlapping. Thus, mobile station 16 may experience better wireless coverage from base station 12 in some areas and better wireless coverage from base station 14 in other areas.

Base stations 12 and 14 may provide access to communication networks, such as public switched telephone network (PSTN) 18 and/or packet-switched network 20, for communication sessions such as voice calls or data calls. For example, base stations 12 and 14 may be controlled by a base station controller (BSC) 22, which may be communicatively coupled with PSTN 18, e.g., via a mobile switching center (MSC) 24, and/or communicatively coupled with packet-switched network 20, e.g., via a packet data serving node (PDSN) 26. With this configuration, mobile station 16 may engage in voice or data calls, via base station 12 and/or base station 14. Such calls could be with one or more endpoints connected to PSTN 18 (such as landline stations or other mobile stations) or with one or more endpoints connected to packet-switched network 20 (such as e-mail servers, messaging servers, streaming media servers, Web servers, or gaming servers).

In some cases, different base stations may be serve a mobile station for a voice or data call at different times. For example, while mobile station 16 is engaged in a call via base station 12, mobile station 16 may move into an area where base station 14 provides better coverage. When this occurs, wireless network 10 may effect a handoff so that the call can be continued via base station 14.

To support wireless communications with mobile stations, such as mobile station 16, a base station may include one or more transceivers that are able to transmit forward link signals to mobile stations and receive reverse link signals from mobile stations. For purposes of illustration, base station 12 is shown in FIG. 1 with transceivers 30 and 32 and base station 14 is shown with transceivers 34 and 36. It is to be understood, however, that base stations 12 and 14 could include a greater or fewer number of transceivers. In addition, while the term transceiver is used herein to refer to a device that includes both a transmitter and a receiver, it is to understood that a base station may include separate transmitters and/or receivers instead of or in addition to transceivers.

In an exemplary embodiment, transceivers 30 and 34 are primary transceivers that transmit forward link signals in dedicated forward-link frequency channels and receive reverse link signals in dedicated reverse-link frequency channels, whereas transceivers 32 and 36 are auxiliary transceivers that are used to transition between forward-link frequency channels and/or between reverse-link frequency channels. For example, transceiver 30 may be configured to transmit forward link signals in a first forward-link frequency channel and transceiver 34 may be configure to transmit forward link signals in a second, different forward-link frequency channel. Similarly, transceiver 30 may be configured to receive reverse link signals in a first reverse-link frequency channel and transceiver 34 may be configure to receive reverse link signals in a second, different reverse-link frequency channel.

The first and second forward-link frequency channels (and the first and second reverse-link frequency channels) may correspond to distinct frequency bands, which could be either adjacent or non-adjacent. For example, the first forward-link frequency channel could be a frequency band in the 800 MHz or 1.9 GHz range, with a frequency bandwidth of approximately 1.23 MHz. The second forward-link frequency channel could be a different 1.23 MHz frequency band in the 800 MHz or 1.9 GHz range. The center frequency in each frequency channel may correspond to the carrier frequency of forward link signals transmitted in the channel. Thus, a forward link signal transmitted in the first forward-link frequency channel may have a carrier frequency, $f_1$, corresponding to the center frequency of the first forward-link frequency channel, and a forward link signal transmitted in the second forward-link frequency channel may have a carrier frequency, $f_2$, corresponding to the center frequency of the second forward-link frequency channel. In the case that the first and second forward-link frequency channels are adjacent channels that are approximately 1.23 MHz wide, $f_1$ and $f_2$ may differ by about 1.23 MHz. It is to be understood, however, that these frequency ranges and bandwidths are exemplary only, as other frequency ranges and bandwidths could be used.

Transceivers 32 and 36 may be configured to transmit forward link signals with variable frequencies and to receive reverse link signals with variable frequencies. For example, transceiver 32 may be configured to transmit a forward link signal while gradually changing its carrier frequency from $f_1$ (corresponding to the first forward-link frequency channel used by transceiver 30) to $f_2$ (corresponding to the second forward-link frequency channel used by transceiver 34), or vice versa. Transceiver 36 may similarly be configured to transmit a forward link signal while gradually its carrier frequency from $f_2$ to $f_1$, or vice versa. Transceivers 32 and 36 may also be used to receive a reverse link signal from a mobile station while the mobile station gradually changes its carrier frequency, for example, from $r_1$ (corresponding to the first reverse-link frequency channel used by transceiver 30) to $r_2$ (corresponding to the second reverse-link frequency channel used by transceiver 34), or vice versa.

To gradually change the carrier frequency of a forward link signal, transceiver 32 or 36 may change the carrier frequency at a specified tuning rate. In an exemplary embodiment, the tuning rate is between about 0.1 and 1 MHz, so as to be able to transition between adjacent 1.23 MHz wide channels in about 1 to 10 seconds. It is to be understood, however, that other tuning rates could be used. A similar tuning rate could be used to change the carrier frequency of a reverse link signal, except that a mobile station would be changing the carrier frequency of the reverse link signal and transceiver 32 or 36 would be receiving the reverse link signal while the carrier frequency is changing.

The tuning rate used by transceiver 32 and/or transceiver 36 (for the forward link and/or reverse link) could be dynamically adjustable. For example, the tuning rate at which the carrier frequency of a forward link signal is changed could be adjusted in response to adjustment requests from the mobile station receiving the forward link signal. Similarly, the tuning rate at which the carrier frequency of a reverse link signal is changed could be adjusted in response to adjustment requests from the wireless network.

As described in more detail below, an auxiliary transceiver, such as transceiver 32, may be used to effect an inter-frequency handoff of a mobile station, such as mobile station 16. For example, mobile station 16 may initially communicate with transceiver 30 via an air interface 40. The communications over air interface 40 may include a forward link signal in a first forward-link frequency channel (using carrier frequency, $f_1$) and a reverse link signal in a first reverse-link frequency channel (using carrier frequency, $r_1$). To transition from the first forward-link and reverse-link frequency channels used by transceiver 30 to the second forward-link and reverse-link frequency channels used by transceiver 34, mobile station 16 may communicate with transceiver 32 over an air interface 42. The communications over air interface 42 may include the forward link signal while its carrier frequency gradually changes from $f_1$ to $f_2$ and may include the reverse link signal while its carrier frequency gradually changes from $r_1$ to $r_2$. Once frequencies $f_2$ and $r_2$ have been reached, mobile station 16 may communicate with transceiver 34 over an air interface 44. The communications over air interface 44 may include the forward link signal in the second forward-link frequency channel (using carrier frequency, $f_2$) and the reverse link signal in the second reverse-link frequency channel (using carrier frequency, $r_2$).

It is to be understood that this use of transceivers 30, 32, and 34 to effect an inter-frequency handoff is exemplary only. For example, instead of transceiver 32 in base station 12, transceiver 36 in base station 14, could be used to transition between the different frequency channels used by transceivers 30 and 34. In addition, an inter-frequency handoff could be used within a base station instead of between base stations. For example, transceiver 32 could be used to transition between the frequency channels used by transceiver 30 and different frequency channels used by another transceiver in the same base station.

3. Exemplary Inter-Frequency Handoff Methods

Figure 2:
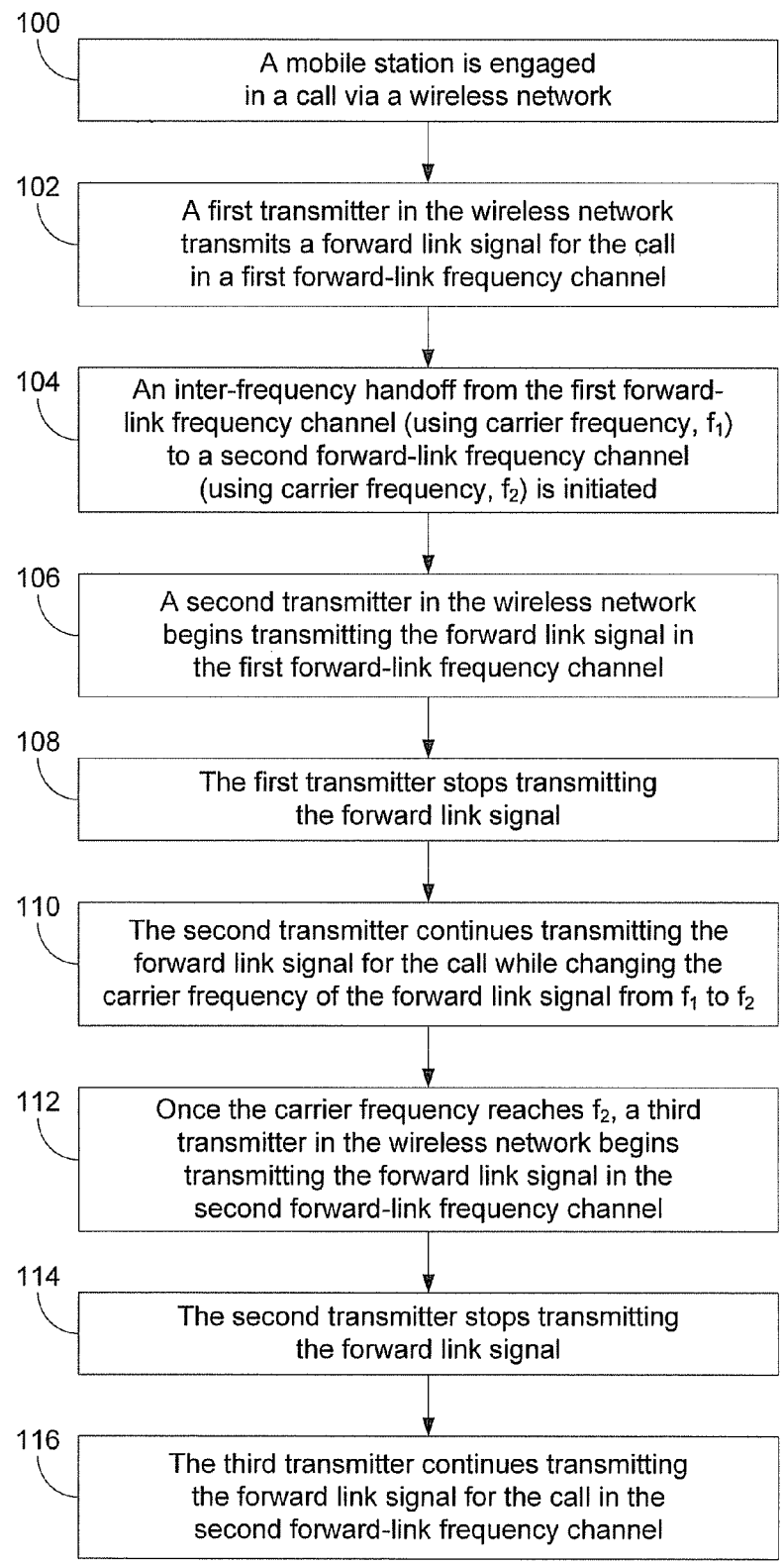
FIG. 2 is a flow chart illustrating a method for effecting an inter-frequency handoff, in accordance with an exemplary embodiment.

FIG. 2 is a flow chart illustrating an exemplary inter-frequency handoff method. The method of FIG. 2 is described with reference to the network architecture illustrated in FIG. 1. It is to be understood, however, that other network architectures could be used.

The method may begin when a mobile station (e.g., mobile station 16) is engaged in a call via a wireless network, as indicated by block 100. The call could be either a voice call or a data call, for example, with an endpoint connected to PSTN 18 or with an endpoint connected to packet-switched network 20. As indicated by block 102 a first transmitter in the wireless network (e.g., a transmitter in primary transceiver 30) transmits a forward link signal for the call in a first forward-link frequency channel. The forward link signal in the first forward-link frequency channel has a carrier frequency, $f_1$, corresponding to the center frequency of the first forward-link frequency channel.

At some point during the call, an inter-frequency handoff from the first forward-link frequency channel (using carrier frequency, $f_1$) to a second forward-link frequency channel (using carrier frequency, $f_2$) is initiated, as indicated by block 104. The inter-frequency handoff could be initiated by the mobile station, for example, after the mobile station detects a stronger pilot signal in the second forward-link frequency channel than in the first forward-link frequency channel. Alternatively, the inter-frequency handoff could be initiated by the wireless network, for example, after the wireless network determines that the mobile station is moving from an area in which the first forward-link frequency channel is used into an area in which the second forward-link frequency channel is used.

To begin the inter-frequency handoff, a second transmitter in the wireless network (e.g., a transmitter in auxiliary transceiver 32) begins transmitting the forward link signal in the first forward-link frequency channel, as indicated by block 106. At this point, the first and second transmitters may simultaneously transmit the forward link signal in the first forward-link channel. In addition, the mobile station may receive the forward link signal from both the first and second transmitters (e.g., using a rake receiver). In the case of CDMA signals, the first and second transmitters may transmit the forward link signal using the same Walsh code.

At some point after the second transmitter begins transmitting the forward link signal, the first transmitter stops transmitting the forward link signal, as indicated by block 108. The second transmitter then continues transmitting the forward link signal for the call while gradually changing the carrier frequency of the forward link signal from $f_1$ to $f_2$, as indicated by block 110. In an exemplary embodiment, the second transmitter changes the carrier frequency at a specified tuning rate.

The specified tuning rate could be a value that is set by the wireless network. Alternatively, the specified tuning rate could be selected for the inter-frequency handoff based on how quickly the mobile station is likely to move between wireless coverage areas. Thus, the specified tuning rate could be determined based on the mobile station's speed and the size of the wireless coverage areas. Faster speeds and smaller coverage areas may result in higher tuning rates, whereas slower speeds and larger coverage areas may result in lower tuning rates.

The specified tuning rate could be fixed throughout the time it takes for the second transmitter to change the carrier frequency from $f_1$ to $f_2$. Alternatively, the tuning rate could be dynamically adjustable. For example, the mobile station may transmit an adjustment request that requests either an increase or decrease in the tuning rate (e.g., based on an error rate in the forward link signal received by the mobile station). In response, the second transmitter may increase or decrease the tuning rate in accordance with the mobile station's adjustment request.

Once the carrier frequency of the forward link signal transmitted by the second transmitter reaches $f_2$, a third transmitter in the wireless network (e.g., a transmitter in primary transceiver 34) begins transmitting the forward link signal in the second forward-link frequency channel, as indicated by block 112. At this point, the second and third transmitters may simultaneously transmit the forward link signal in the second forward-link channel. In addition, the mobile station may receive the forward link signal from both the second and third transmitters (e.g., using a rake receiver). In the case of CDMA signals, the second and third transmitters may transmit the forward link signal using the same Walsh code.

At some point after the third transmitter begins transmitting the forward link signal, the second transmitter stops transmitting the forward link signal, as indicated by block 114. The third transmitter then continues transmitting the forward link signal for the call in the second forward-link frequency channel, as indicated by block 116.

In this way, an inter-frequency handoff may be conducted in a "make before break" fashion. This, in turn, may beneficially reduce the chances of the call being dropped during the inter-frequency handoff.

Figure 3:
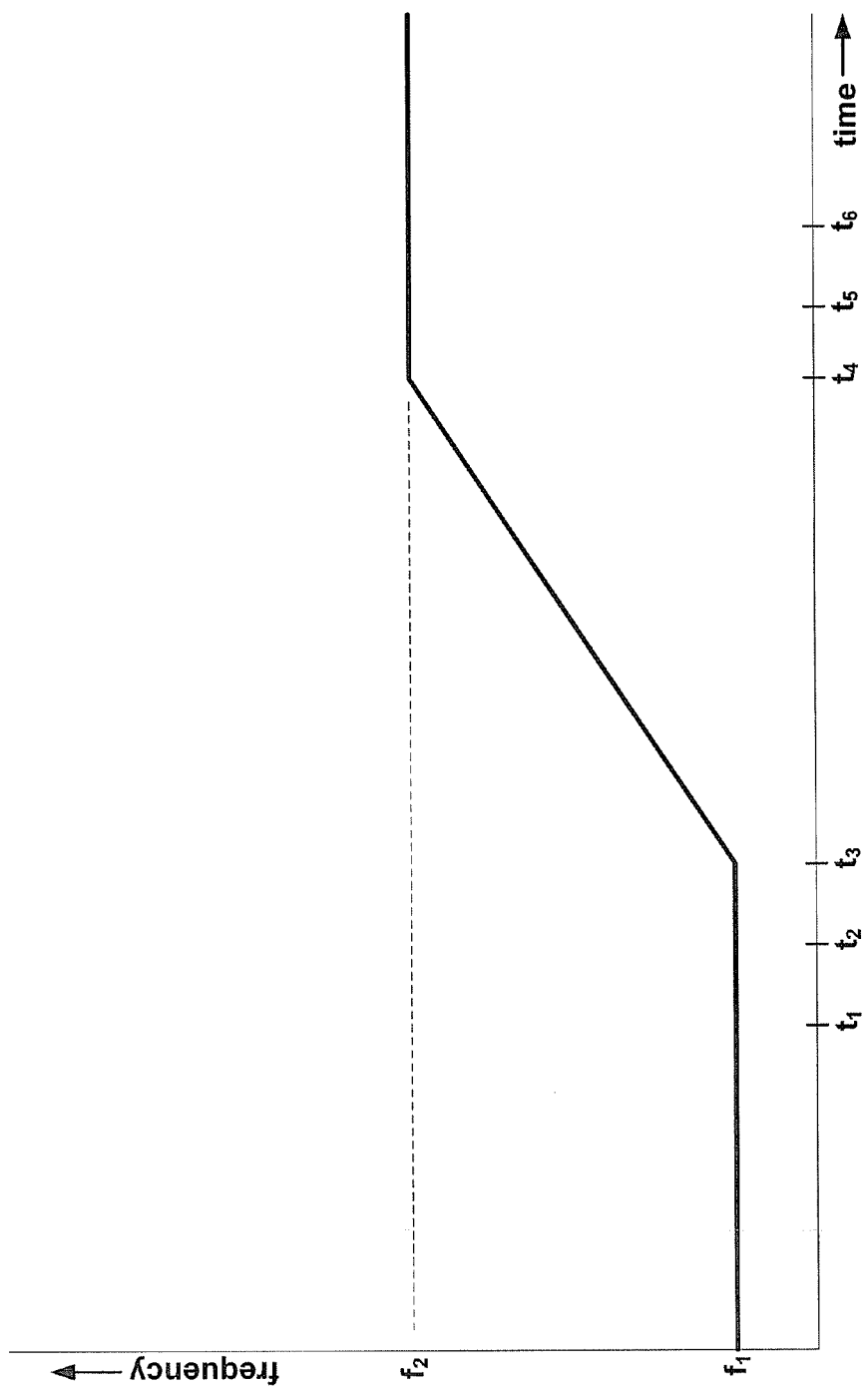
FIG. 3 is a graph of the carrier frequency of a forward link signal as a function of time, in accordance with an exemplary embodiment.

FIG. 3 is graph illustrating how the carrier frequency of the forward link signal may change as a function of time in the method of FIG. 2. Initially, the forward link signal is transmitted by the first transmitter with carrier frequency, $f_1$. At time $t_1$, the second transmitter begins transmitting the forward link with carrier frequency, $f_1$, so that the forward link signal is transmitted by the first and second transmitters simultaneously. Subsequently, at time $t_2$, the first transmitter stops transmitting the forward link signal, so that the forward link signal is transmitted solely by the second transmitter.

Then, at time $t_3$, the second transmitting begins gradually changing the carrier frequency of the forward link signal from $f_1$ to $f_2$. The carrier frequency of the forward link signal reaches $f_2$ at time $t_4$. At time $t_5$, the third transmitter begins transmitting the forward link signal with carrier frequency $f_2$, so that the forward link signal is being transmitted by the second and third transmitters simultaneously. Subsequently, at time $t_6$, the second transmitter stops transmitting the forward link signal, so that the forward link signal is transmitted solely by the third transmitter. Thereafter, the third transmitter continues transmitting the forward link signal with carrier frequency $f_2$.

Although FIG. 3 shows the carrier frequency being increased, it is to be understood that the carrier frequency could also be decreased. In addition, although the change in carrier frequency from $f_1$ to $f_2$ during the $t_3$ to $t_4$ time period is depicted in FIG. 3 as occurring at a uniform tuning rate, it is to be understood that the tuning rate could be variable during the $t_3$ to $t_4$ time period. It is also possible for the carrier frequency to be changed from $f_1$ to $f_2$ in a series of small steps in this time period, rather than continuously.

While the second transmitter is changing the carrier frequency of the forward link signal from $f_1$ to $f_2$, the mobile station that is receiving the forward link signal may also change the carrier frequency of a reverse link signal that it is transmitting. For example, during the $t_3$ to $t_4$ time period, the mobile station may gradually change the carrier frequency of the reverse link signal from $r_1$ to $r_2$. The wireless network may also use different receivers to receive the reverse link signal from the mobile station. For example, when the mobile station initially transmits the reverse link signal with carrier frequency $r_1$, the wireless network may use a first receiver to receive it. However, the wireless network may use a second receiver to receive the reverse link signal when its carrier frequency is changing from $r_1$ to $r_2$. After the carrier frequency has reached $r_2$, the wireless network may use a third receiver to continue receiving the reverse link signal.

Figure 4:
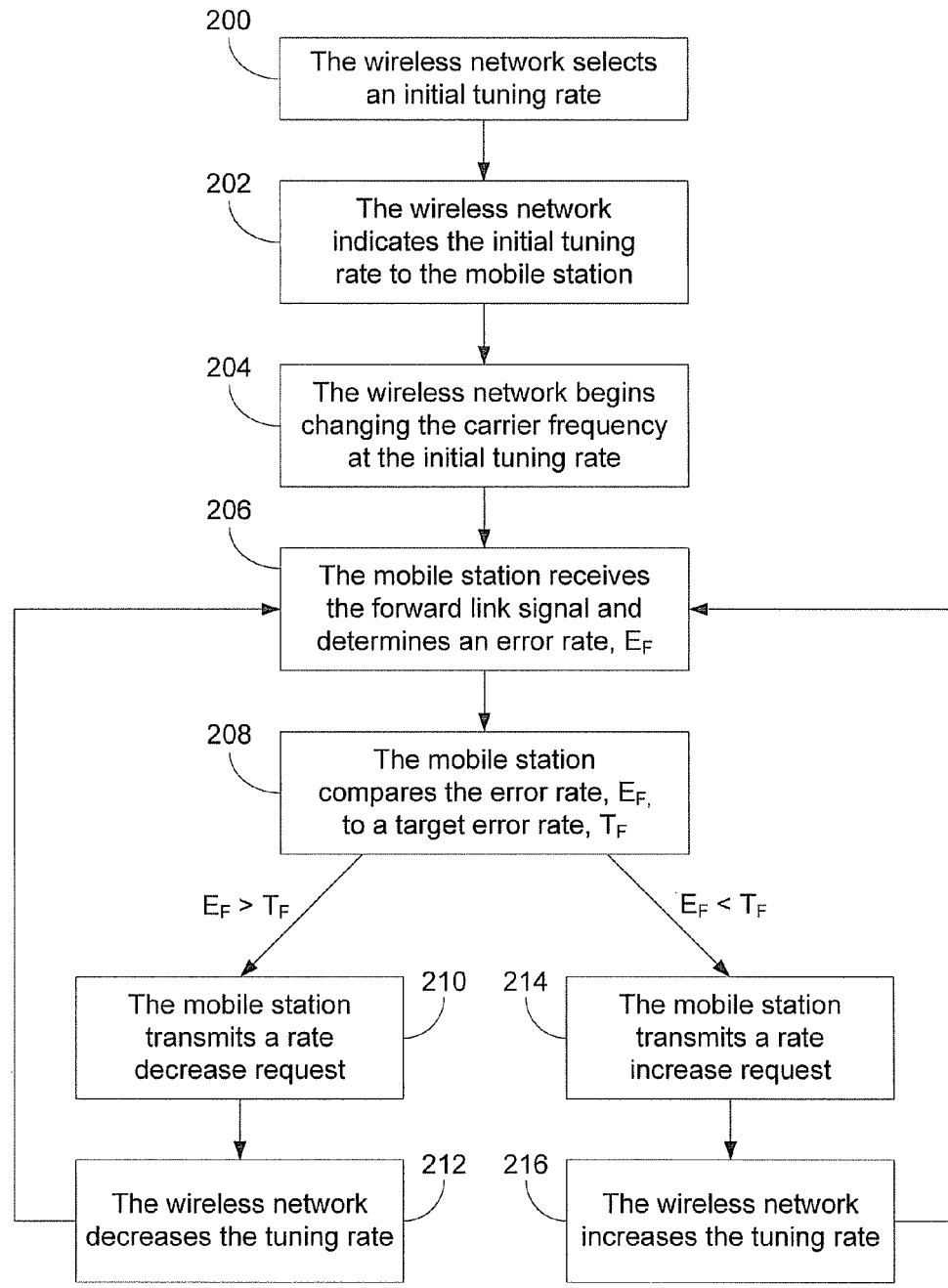
FIG. 4 is a flow chart illustrating a method for adjusting a tuning rate used for changing the carrier frequency of a forward link signal, in accordance with an exemplary embodiment.

As noted above, the tuning rate that the second transmitter uses during the $t_3$ to $t_4$ time period could be variable. For example, the tuning rate could be dynamically adjustable in response to adjustment requests from the mobile station. FIG. 4 is a flowchart illustrating an example of how the wireless network may adjust the tuning rate at which it changes the carrier frequency of the forward link signal for an inter-frequency handoff in response to requests from the mobile station receiving the forward link signal.

The wireless network may select an initial tuning rate, as indicated by block 200. The wireless network could select the initial tuning rate based on various factors, such as the speed of the mobile station and the size of the wireless coverage areas involved in the inter-frequency handoff. Alternatively, the wireless network may use a default value as the initial tuning rate. The default value could be a value that adapts based on historical data regarding what tuning rates have been successful for inter-frequency handoffs between these wireless coverage areas.

Once the wireless network has selected the initial tuning rate, the wireless network may indicate the initial tuning rate to the mobile station, as indicated by block 202. For example, the wireless network may transmit to the mobile station an overhead message that identifies the initial tuning rate.

The wireless network then begins changing the carrier frequency of the forward link signal that it is transmitting to the mobile station, as indicated by block 204. The mobile station receives the forward link signal and determines an error rate, $E_F$, as indicated by block 206. The error rate could be, for example, a frame error rate. The mobile station then compares the error rate, $E_F$ to a target error rate, $T_F$, as indicated by block 208. If the error rate, $E_F$, is greater than the target error rate, $T_F$, the mobile station may transmit a rate decrease request, as indicated by block 210. In response, the wireless network decreases the tuning rate, as indicated by block 212. On the other hand, if the error rate, $E_F$, is less than the target error rate, $T_F$, the mobile station may transmit a rate increase request, as indicated by block 214. In response, the wireless network increases the tuning rate, as indicated by block 216.

After adjusting the tuning rate (either increasing or decreasing the tuning rate), the wireless network continues transmitting the forward link signal with the adjusted tuning rate. The process then loops back to block 206, in which the mobile station receives the forward link and determines an error rate. In this way, the tuning rate used to change the carrier frequency of the forward link signal may be dynamically adjusted in order to try to match the error rate in the forward link signal received by the mobile station to a target error rate for the forward link.

In some cases, however, the adjustment process illustrated in FIG. 4 may not result in a sufficiently error-free forward link signal received by the mobile station. In such cases, the attempt to change the carrier frequency of the forward link signal as it is being transmitted may be aborted and a hard handoff may be used instead.

The tuning rate that the mobile station uses to change the carrier frequency of the reverse link signal may be similarly adjustable. For example, the wireless network may receive the reverse link signal, determine an error rate, $E_R$, compare $E_R$ to a target error rate, $T_R$, and then transmit an adjustment request to the mobile station based on the comparison. The mobile station may then either increase or decrease the tuning rate, as requested by the wireless network. In this way, the tuning rate used to change the carrier frequency of the reverse link signal may be dynamically adjusted in order to try to match the error rate in the reverse link signal received by the wireless network to a target error rate for the reverse link. Alternatively, the tuning rate used for the reverse link signal could be dependent on the tuning rate used for the forward link signal.

By gradually changing the carrier frequency of the forward link signal and/or the carrier frequency of the reverse link signal, an inter-frequency handoff may be effected without using a "break before make" or hard handoff. Moreover, by adjusting the tuning rate used for the forward link signal and/or the reverse link signal based on error rates, signal quality during the inter-frequency handoff may be maintained.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for effecting an inter-frequency handoff of a mobile station engaged in a call via a wireless network, said method comprising:
 using a first forward-link frequency channel for said call, wherein using said first forward-link frequency channel for said call comprises said wireless network transmitting a forward link signal in said first forward-link frequency channel to said mobile station;

selecting a tuning rate, wherein selecting said tuning rate comprises said wireless network selecting said tuning rate;

transmitting a message, wherein transmitting said message comprises said wireless network transmitting said message to said mobile station, wherein said message specifies said tuning rate;

transitioning from said first forward-link frequency channel to a second forward-link frequency channel during said call, wherein transitioning from said first forward-link frequency channel to said second forward-link frequency channel comprises said wireless network transmitting said forward link signal to said mobile station while gradually changing a carrier frequency of said forward link signal from a first-channel frequency to a second-channel frequency via a plurality of intermediate frequencies, wherein said first-channel frequency corresponds to said first forward-link frequency channel and said second-channel frequency corresponds to said second forward-link frequency channel, wherein gradually changing said carrier frequency of said forward link signal from said first-channel frequency to said second-channel frequency comprises said wireless network changing said carrier frequency at said tuning rate; and using said second forward-link frequency channel for said call, wherein using said second forward-link frequency channel for said call comprises said wireless network transmitting said forward link signal in said second forward-link frequency channel to said mobile station.

2. The method of claim 1, wherein said tuning rate is between about 0.1 and 1 Megahertz per second.

3. The method of claim 1, further comprising: said wireless network determining a speed of said mobile station; and said wireless network selecting said tuning rate based on said speed.

4. The method of claim 1, further comprising: said wireless network receiving an adjustment request from said mobile station; and said wireless network adjusting said tuning rate in response to said adjustment request.

5. The method of claim 4, wherein said adjustment request requests an increase in said tuning rate, and said wireless network increases said tuning rate in response to said adjustment request.

6. The method of claim 4, wherein said adjustment request requests a decrease in said tuning rate, and said wireless network decreases said tuning rate in response to said adjustment request.

7. The method of claim 1, wherein said first and second forward-link frequency channels are adjacent in frequency.

8. The method of claim 7, wherein each of said first and second forward-link frequency channels has a bandwidth of about 1.23 Megahertz.

9. The method of claim 8, wherein gradually changing said carrier frequency of said forward link signal from said first-channel frequency to said second-channel frequency comprises changing said carrier frequency by about 1.23 Megahertz in about 1 to 10 seconds.

10. The method of claim 1, wherein said wireless network transmitting said forward link signal in said first forward-link channel to said mobile station comprises a first transmitter transmitting said forward-link signal, wherein said wireless network transmitting said forward link signal to said mobile station while gradually changing carrier frequency of said forward link signal comprises a second transmitter transmitting said forward-link signal, and wherein said wireless network transmitting said forward link signal in said second forward-link frequency channel to said mobile station comprises a third transmitter transmitting said forward-link signal.

11. The method of claim 10, wherein said forward link signal is a spread spectrum signal encoded with a particular Walsh code, and wherein each of said first, second, and third transmitters encodes said forward link signal with said particular Walsh code.

12. The method of claim 1, further comprising: using a first reverse-link frequency channel for said call, wherein using said first reverse-link frequency channel for said call comprises said wireless network receiving from said mobile station a reverse link signal in said first reverse-link frequency channel; transitioning from said first reverse-link frequency channel to a second reverse-link frequency channel during said call, wherein transitioning from said first reverse-link frequency channel to said second reverse-link frequency channel comprises said wireless network receiving said reverse link signal from said mobile station while a carrier frequency of said reverse link signal gradually changes from a first reverse-channel frequency to a second reverse-channel frequency, wherein said first reverse-channel frequency corresponds to said first reverse-link frequency channel and said second reverse-channel frequency corresponds to said second reverse-link frequency channel; and using said second reverse-link frequency channel for said call, wherein using said second reverse-link frequency channel for said call comprises said wireless network receiving from said mobile station said reverse link signal in said second reverse-link frequency channel.

13. A method for a mobile station engaged in a call via a wireless network, said method comprising:

using a first forward-link frequency channel for said call, wherein using said first forward-link frequency channel for said call comprises said mobile station receiving a forward link signal in said first forward-link frequency channel from said wireless network;

receiving a message, wherein receiving said message comprises said mobile station receiving said message from said wireless network, wherein said message specifies a tuning rate;

transitioning from said first forward-link frequency channel to a second forward-link frequency channel during said call, wherein transitioning from said first forward-link frequency channel to said second forward-link frequency channel comprises said mobile station receiving said forward link signal from said wireless network while a carrier frequency of said forward link signal gradually changes from a first-channel frequency to a second-channel frequency via a plurality of intermediate frequencies, wherein said first-channel frequency corresponds to said first forward-link frequency channel and said second-channel frequency corresponds to said second forward-link frequency channel, wherein said carrier frequency of said forward link signal gradually changing from said first-channel frequency to said second-channel frequency comprises said wireless network changing said carrier frequency at said tuning rate; and using said second forward-link frequency channel for said call, wherein using said second forward-link frequency channel for said call comprises said mobile station receiving said forward link signal in said second forward-link frequency channel from said wireless network.

14. The method of claim 13, further comprising: using a first reverse-link frequency channel for said call, wherein using said first reverse-link frequency channel for said call comprises said mobile station transmitting a reverse link signal in said first reverse-link frequency channel to said wireless network; transitioning from said first reverse-link frequency channel to a second reverse-link frequency channel during said call, wherein transitioning from said first reverse-link frequency channel to said second reverse-link frequency channel during said call comprises said mobile station transmitting said reverse link signal to said wireless network while gradually changing a carrier frequency of said reverse link signal from a first reverse-channel frequency to a second reverse-channel frequency, wherein said first reverse-channel frequency corresponds to said first reverse-link frequency channel and said second reverse-channel frequency corresponds to said second reverse-link frequency channel; and using said second reverse-link frequency channel for said, wherein using said second reverse-link frequency channel for said call comprises said mobile station transmitting said reverse link signal in said second reverse-link frequency channel to said wireless network.

\* \* \* \* \*